UNITED STATES PATENT OFFICE.

GEORGE GREENWOOD, OF LAWRENCE, MASSACHUSETTS.

IMPROVEMENT IN ROTARY CUTTER-HEADS FOR MATCHING BOARDS.

Specification forming part of Letters Patent No. 135,907, dated February 18, 1873.

*To all whom it may concern:*

Be it known that I, GEORGE GREENWOOD, of Lawrence, of the county of Essex and State of Massachusetts, have invented a new and useful Improvement in Rotary Cutter-Heads for Matching Boards; and do hereby declare the same to be fully described in the following specification, and represented in the accompanying drawing, of which —

Figure 1:
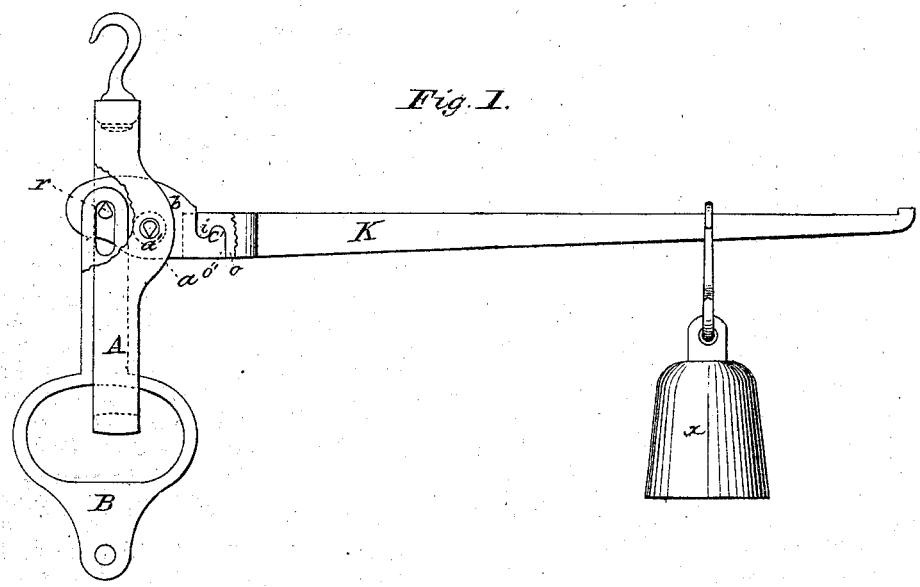
Figure 2:
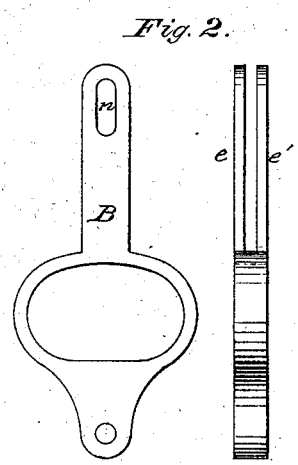
Figure 3:
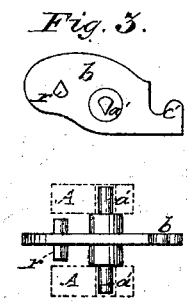

Figure 1 denotes an inner side elevation, and Fig. 2 an edge view of one of my improved cutter-heads and its cutters.

In such drawing, A denotes a disk provided with a hub, $a$, and also having extended back from the periphery and in the side a series of circular curved grooves, $b\ b\ b\ b$, to receive corresponding-shaped cutters $c\ c\ c\ c$. Each cutter projects at its front or cutting end out of the groove and beyond the periphery of the disk, and is formed as shown. Besides, each cutter extends laterally out of the groove a short distance, and is held in place by a clamp-screw, $d$, going through the disk, and provided with a nut, $e$, all being as represented.

Under each cutter the disk is notched, as shown at $f$, the purpose of the notch being to catch and deflect off laterally the shavings made by the cutter while at work.

By curving the cutter and its holding-groove, as shown, the cutter becomes better supported than it would be were it straight and its groove straight. When straight there is so little substance in the wheel or disk over each cutter as to render the wheel or disk liable to break under the strain of the cutter. Besides, by curving the cutter and its groove, more cutters can be applied to the disk than when the cutters and their grooves are straight.

I make no claim to a cutter-head provided with straight cutters, arranged in straight grooves in the side of the head; nor do I claim curved cutters as made, supported, and arranged, as and for the purpose as shown and represented in the United States patent No. 39,019, dated June 23, 1863.

I claim—

The improved cutter-head, made with circular curved grooves or cutter-sockets, and with deflecting notches $f$ arranged in it, as set forth, and in combination with correspondingly-curved cutters fixed in such grooves by clamps $d$, all being as shown and described.

<div style="text-align:right">
his<br>
GEO. + GREENWOOD.<br>
mark.
</div>

Witnesses:
   R. H. EDDY,
   J. R. SNOW.

T. C. HARGRAVE.
Steelyard Scales.

No. 135,908.          Patented Feb. 18, 1873.

Witnesses:
T. C. Brecht.
D. P. Howl

Inventor:
Thos. C. Hargrave
by his attys
A. H. & R. N. Evans

AM. PHOTO-LITHOGRAPHIC CO. N.Y. (OSBORNE'S PROCESS)